(12) United States Patent
Daulton et al.

(10) Patent No.: US 11,999,314 B1
(45) Date of Patent: Jun. 4, 2024

(54) SEAT BELT STRUCTURE FOR A VEHICLE

(71) Applicant: Honda Motor Co., Ltd., Tokyo (JP)

(72) Inventors: Eric M. Daulton, Marysville, OH (US);
Ryan W. Van Voorhis, Powell, OH (US); John F Howard, Jr., Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/154,730

(22) Filed: Jan. 13, 2023

(51) Int. Cl.
*B60R 22/24* (2006.01)
*B60R 13/02* (2006.01)
*B60R 22/18* (2006.01)
*B60R 11/00* (2006.01)

(52) U.S. Cl.
CPC .......... *B60R 22/18* (2013.01); *B60R 13/0237* (2013.01); *B60R 22/24* (2013.01); *B60R 2011/0031* (2013.01); *B60R 2022/1806* (2013.01)

(58) Field of Classification Search
CPC .............. B60R 22/24; B60R 2022/021; B60R 2022/029; B60R 2011/0031
See application file for complete search history.

(56) References Cited

U.S. PATENT DOCUMENTS

| | | | |
|---|---|---|---|
| 5,957,499 A * | 9/1999 | Kempf | B60R 22/023 280/801.1 |
| 6,336,662 B1 | 1/2002 | Kurita et al. | |
| 10,207,636 B1 * | 2/2019 | Surman | B60R 22/02 |
| 2003/0173767 A1 * | 9/2003 | Kobayashi | B60R 22/023 280/801.1 |
| 2004/0150212 A1 * | 8/2004 | Russell | B60R 22/023 280/808 |
| 2017/0253196 A1 * | 9/2017 | Barrow | B60N 3/101 |
| 2019/0152429 A1 * | 5/2019 | Jaradi | B60R 22/30 |
| 2019/0292847 A1 | 9/2019 | Aldeborg | |

FOREIGN PATENT DOCUMENTS

| | | | | |
|---|---|---|---|---|
| CN | 101670822 A | * | 3/2010 | |
| DE | 10208642 A1 | | 12/2003 | |
| DE | 20317226 U1 | * | 2/2004 | ............ B60R 22/24 |

(Continued)

OTHER PUBLICATIONS

Machine translation of JP2008049838 [Retrieved on Jun. 17, 2023]. (Year: 2023).*

(Continued)

*Primary Examiner* — Barry Gooden, Jr.
(74) *Attorney, Agent, or Firm* — Mark E. Duell; American Honda Motor Co., Inc.

(57) ABSTRACT

A seat belt structure for a vehicle includes a safety belt webbing configured to restrain an occupant of a seat of the vehicle and extending along a height of a side lining of the vehicle. The seat belt structure also includes a tongue movably connected to the safety belt webbing and adapted to move along the safety belt webbing. Moreover, the seat belt structure includes a belt holder engaged to the side lining and defining a cavity therebetween. The belt holder is arranged proximate to a floor of the vehicle. Further, a portion of the seat belt webbing extends and is held between the belt holder and the side lining, and the belt holder is configured to removably hold a portion of the tongue inside the cavity.

12 Claims, 7 Drawing Sheets

(56) References Cited

FOREIGN PATENT DOCUMENTS

| | | | | |
|---|---|---|---|---|
| DE | 202005015443 U1 | * | 3/2007 | ............. B60R 21/02 |
| DE | 102010032083 A1 | * | 3/2011 | ............. B60R 22/02 |
| DE | 102010035732 A1 | * | 3/2012 | ............ B60R 22/022 |
| DE | 102014017516 A1 | * | 6/2016 | ............. B60R 22/03 |
| DE | 102017000797 A1 | | 7/2017 | |
| DE | 102019000618 A1 | | 6/2019 | |
| EP | 1371531 A2 | * | 12/2003 | ............ B60R 22/023 |
| EP | 1702816 A1 | * | 9/2006 | ............ B60R 22/023 |
| EP | 2033847 B1 | | 3/2010 | |
| FR | 2982557 A1 | * | 5/2013 | ............. B60R 22/02 |
| FR | 2982558 A3 | * | 5/2013 | ............. B60R 22/02 |
| FR | 3004404 A1 | * | 10/2014 | ............. B60R 22/02 |
| JP | 2008049838 A | * | 3/2008 | |
| JP | 2008213500 A | * | 9/2008 | |
| JP | 2017109554 A | * | 6/2017 | |
| KR | 101609517 B1 | | 4/2016 | |

OTHER PUBLICATIONS

Toyota Highlander owner's manual excerpt [online]. Wayback Machine Retrieved [retrieved on Mar. 13, 2016]: <URL: https://web.archive.org/web/20160313191153/https://www.tohighlander.com/seat_belt_pretensioners_front_seats_-16.html>. (Year: 2016).*

* cited by examiner

SEAT BELT STRUCTURE FOR A VEHICLE

BACKGROUND

The disclosed subject matter relates generally to vehicles. More particularly, the disclosed subject matter relates a vehicle having rear seats adapted to be moved to a folded position.

Vehicles 10, shown in FIG. 1, such as, minivans, typically includes three rows of seats and the seats 12 of the rearmost row can be folded to extend a cargo space 14 of the vehicle 10 to accommodate relatively a large cargo 16. However, during loading of the cargo 16 inside the cargo space 14, the cargo 16, generally, contacts the seat belts 18 associated with seats 12, hindering the loading and positioning of the cargo 16 inside the vehicle 10, which is undesirable.

SUMMARY

In accordance with one embodiment of the present disclosure, a seat belt structure for a vehicle is disclosed. The vehicle has a side lining extending along a sidewall of the vehicle. The seat belt structure includes a safety belt webbing configured to restrain an occupant of a seat of the vehicle and extending along a height of the side lining of the vehicle. The seat belt structure also includes a tongue movably connected to the safety belt webbing and adapted to move along the safety belt webbing. Moreover, the seat belt structure includes a belt holder engaged to the side lining and defining a cavity therebetween. The belt holder is arranged proximate to a floor of the vehicle. Further, a portion of the seat belt webbing extends and is held between the belt holder and the side lining, and the belt holder is configured to removably hold a portion of the tongue inside the cavity.

In accordance with another embodiment of the present disclosure, a vehicle is provided. The vehicle includes a vehicle body defining a passenger compartment and a cargo area. Moreover, the vehicle includes a plurality of seats arranged inside the passenger compartment and disposed in a plurality of rows including a rear row. One or more seats of the rear row is configured to move between an upright position and a folded position. Further, the vehicle includes a side lining mounted on a sidewall of the vehicle body and extending from a rear end of the vehicle towards a front end of the vehicle. The vehicle also includes a safety belt webbing configured to restrain an occupant of the one or more seats of the rear row and extending along a height of the side lining of the vehicle. Furthermore, the vehicle includes a tongue movably connected to the safety belt webbing and adapted to move along the safety belt webbing, and a belt holder engaged to the side lining and defining a cavity therebetween. The belt holder is arranged proximate to a floor of the vehicle. A portion of the seat belt webbing extends between the belt holder and the side lining, and the belt holder is configured to removably hold a portion of the tongue inside the cavity.

In accordance with yet a further embodiment of the present disclosure a side-lining structure for a vehicle is disclosed. The vehicle has a vehicle body including a sidewall. The side-lining structure includes a side lining adapted to be mounted to the sidewall and configured to extend from a rear end of the vehicle towards a front end of the vehicle. The side-lining structure also includes a belt holder engaged to the side lining and adapted to be disposed proximate to a floor of the vehicle. Moreover, a seat belt webbing is configured to restrain an occupant of a seat of the vehicle. A portion of the seat belt webbing extends and is held between the belt holder and the side lining.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 2-7, wherein like numbers indicate the same or corresponding elements throughout the views.

Figure 1:
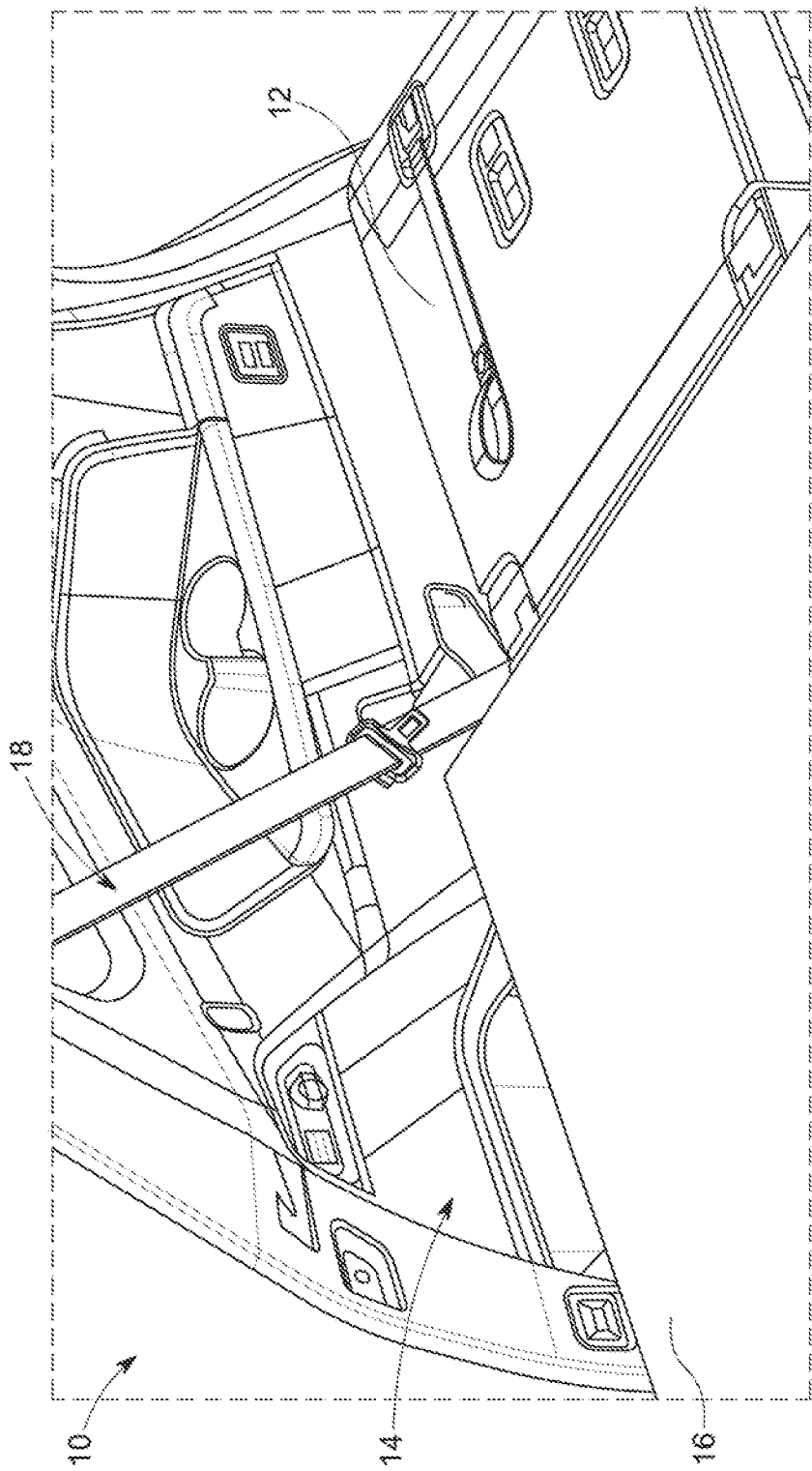
FIG. 1 is an inside view of a vehicle having a seat belt as is known in the prior art, and depicting an interference between a cargo and the seat belt while loading the cargo inside a cargo area of the vehicle.
Figure 2:
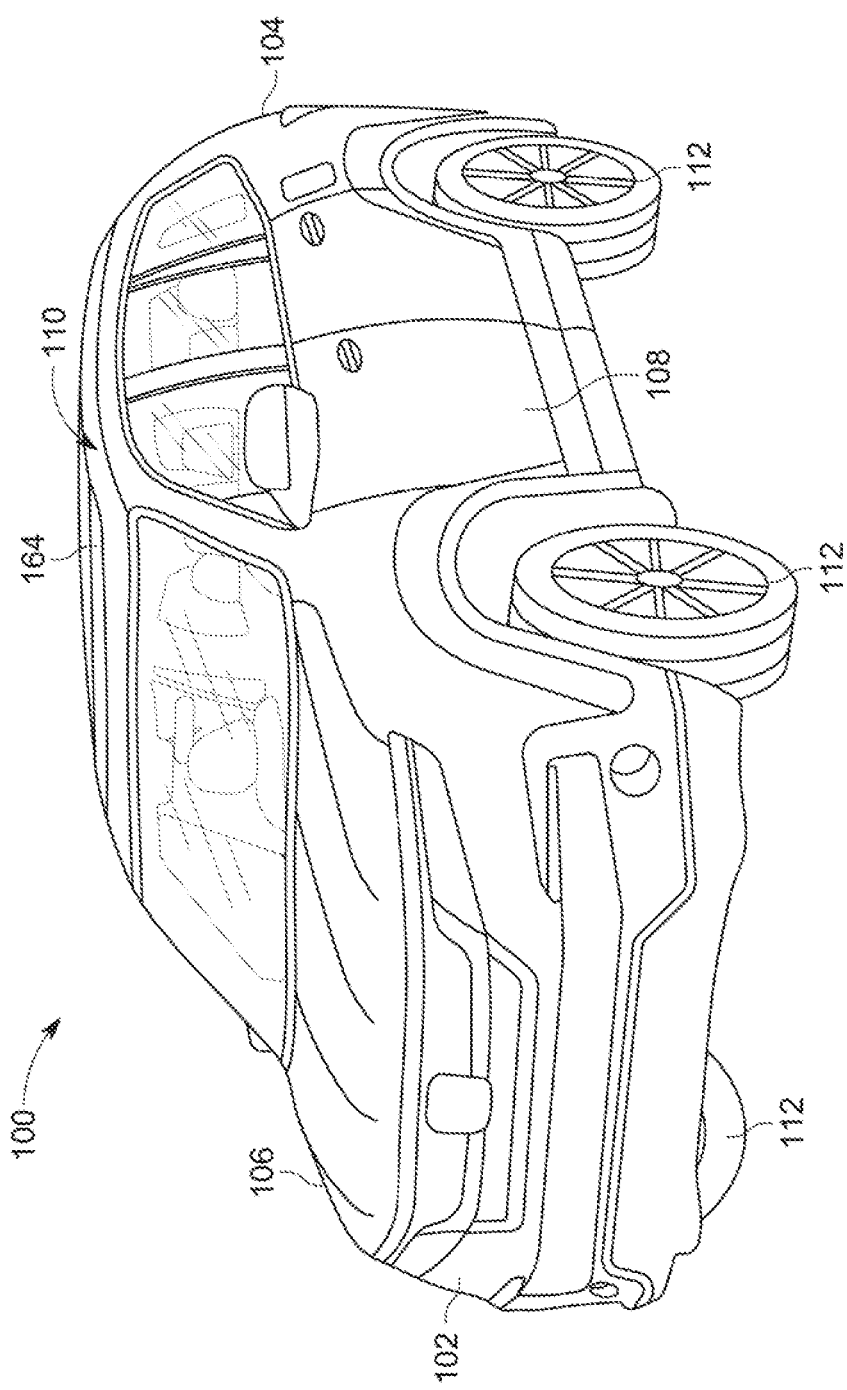
FIG. 2 is a front perspective view of a vehicle, in accordance with one embodiment of the present disclosure.
Figure 3:
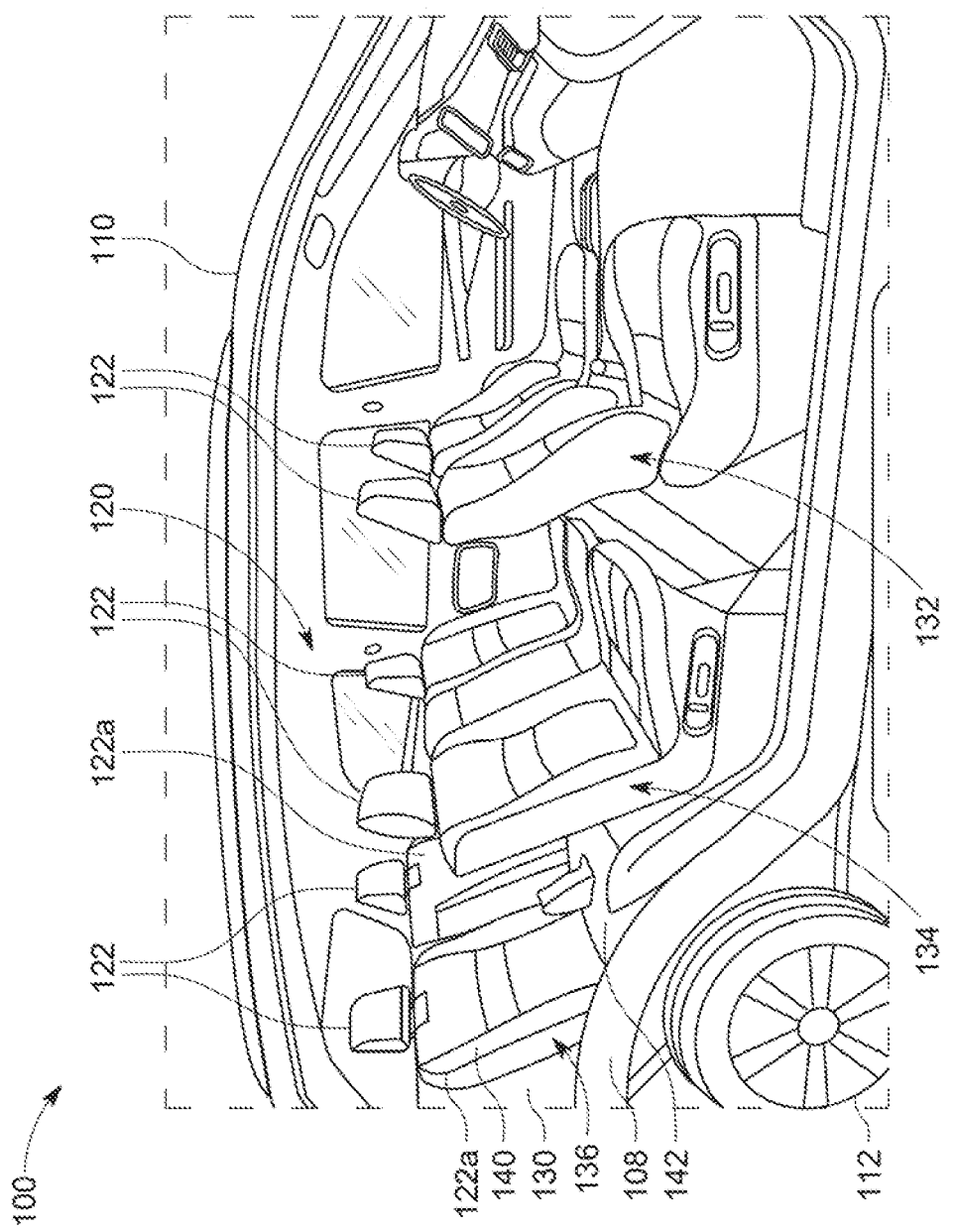
FIG. 3 is a side perspective view of the vehicle with one longitudinal side removed and depicting a plurality of seats arranged in a plurality of rows, in accordance with one embodiment of the present disclosure.

FIG. 2 illustrates a front perspective view of a vehicle, indicated generally at 100, in accordance with one embodiment of the present disclosure. Referring to FIGS. 2 and 3, the vehicle 100 is shown as a minivan 102 having 3 rows of seats. However, the vehicles 100 in accordance with alternative embodiments can comprise any variety of vehicles, including hatchbacks, multi-utility vehicles, sport utility vehicles, jeeps, truck, etc., for example.

The vehicle 100 includes a front end 102, a rear end 104, a first longitudinal side 106 (hereinafter referred to as a left side 106), a second longitudinal side 108 (hereinafter referred to as a right side 108), and a vehicle body 110 extending from the front end 102 to the rear end 104 and supported on a plurality of wheels 112. As shown in FIG. 3, the vehicle body 110 defines a passenger compartment 120 having a plurality of seats 122 to facilitate a seating of a plurality of passengers including a driver inside the vehicle 100, and a cargo area 130 arranged at a rear of the vehicle body 110 to enable a storage of one or more cargo inside the vehicle 100. In the illustrated embodiment, the plurality of seats 122 is arranged in a plurality of rows, for example, a first row 132 (i.e., a front row 132), a second row 134 (i.e., middle row 134), and a third row 136 (i.e., a rear row 136), extending in a lateral direction of the vehicle 100.

Figure 4:
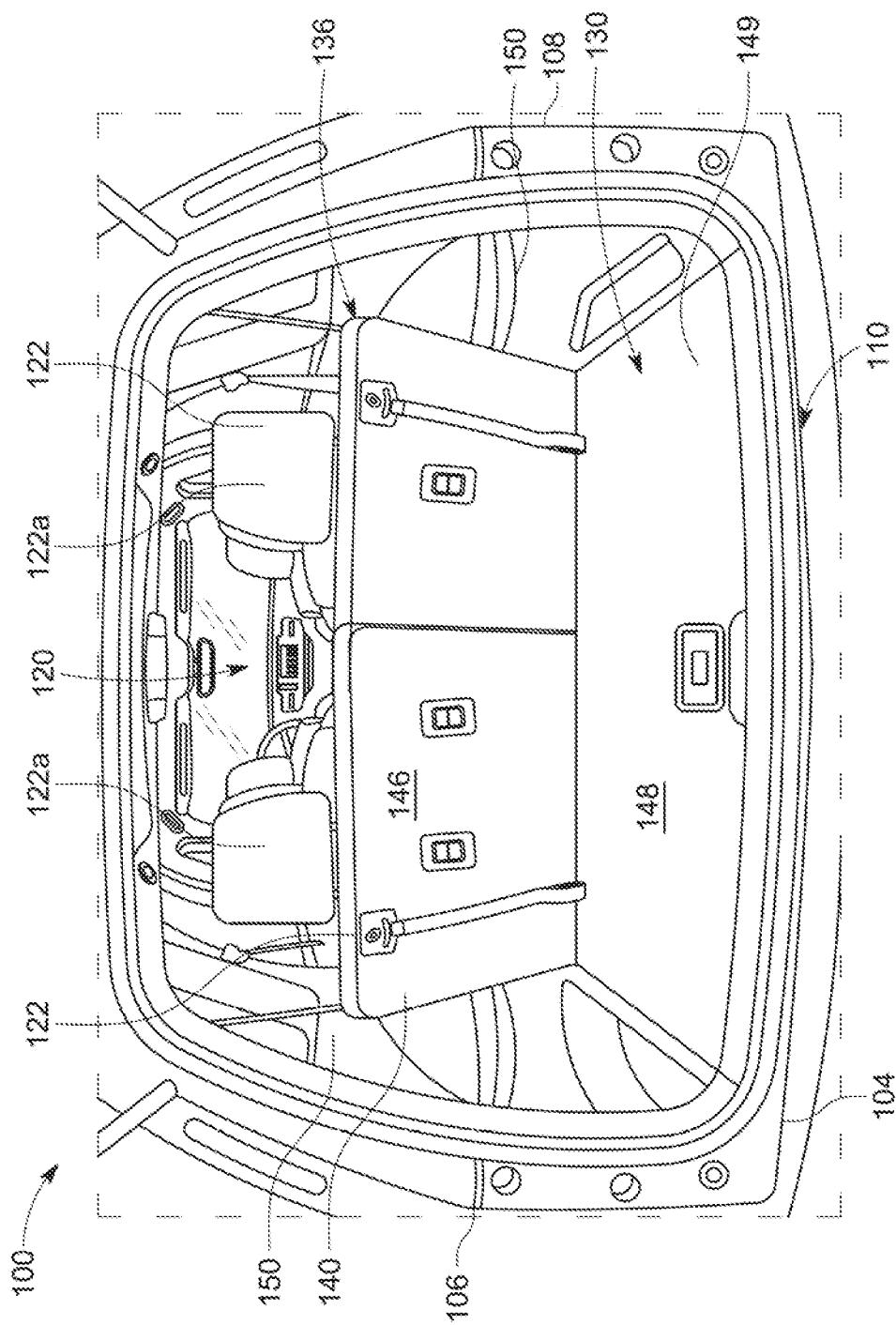
FIG. 4 is a rear perspective view of the vehicle depicting a cargo area of the vehicle and one or more seats of a rear row arranged in an upright position, in accordance with one embodiment of the present disclosure.
Figure 5:
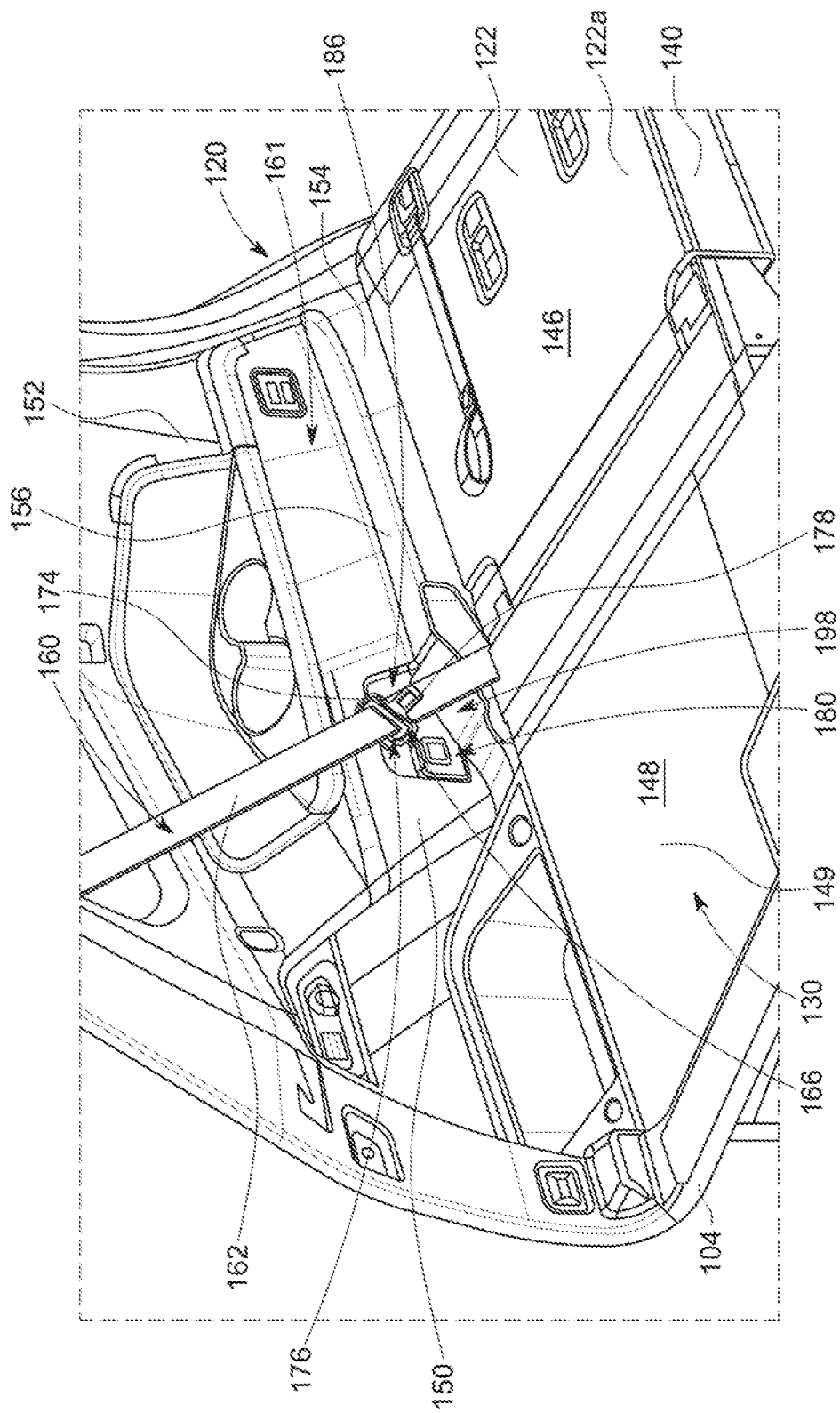
FIG. 5 is an enlarged rear perspective view of an interior of the vehicle depicting the seats of the rear row arranged in a folded position, in accordance with one embodiment of the present disclosure.

Further, one or more seats 122a of the rear row 136 is configured to be arranged in a raised position (i.e., upright position) (shown in FIGS. 3 and 4) and a folded position (shown in FIG. 5). In the raised position, a backrest 140 of the seat 122a extends in a vertical direction to enable a seating of the passenger on the seat 122a, while in the folded position, the backrest 140 is disposed in a substantially horizontal position, facing a seat member 142 of the seat 122a. Also, as shown in FIG. 5, the seats 122a of the rear row 136 are configured/structured such that in the folded position, a rear surface 146 of the backrest 140 of the seats 122a are arranged substantially flush with an upper surface 148 of a floor 149 of the cargo area 130. One or more seats 122a of the rear row 136 are moved to the folded position to extend the cargo area 130 of the vehicle 100 to enable a loading/storage of cargo having relatively longer lengths, for example, boards.

Figure 6:
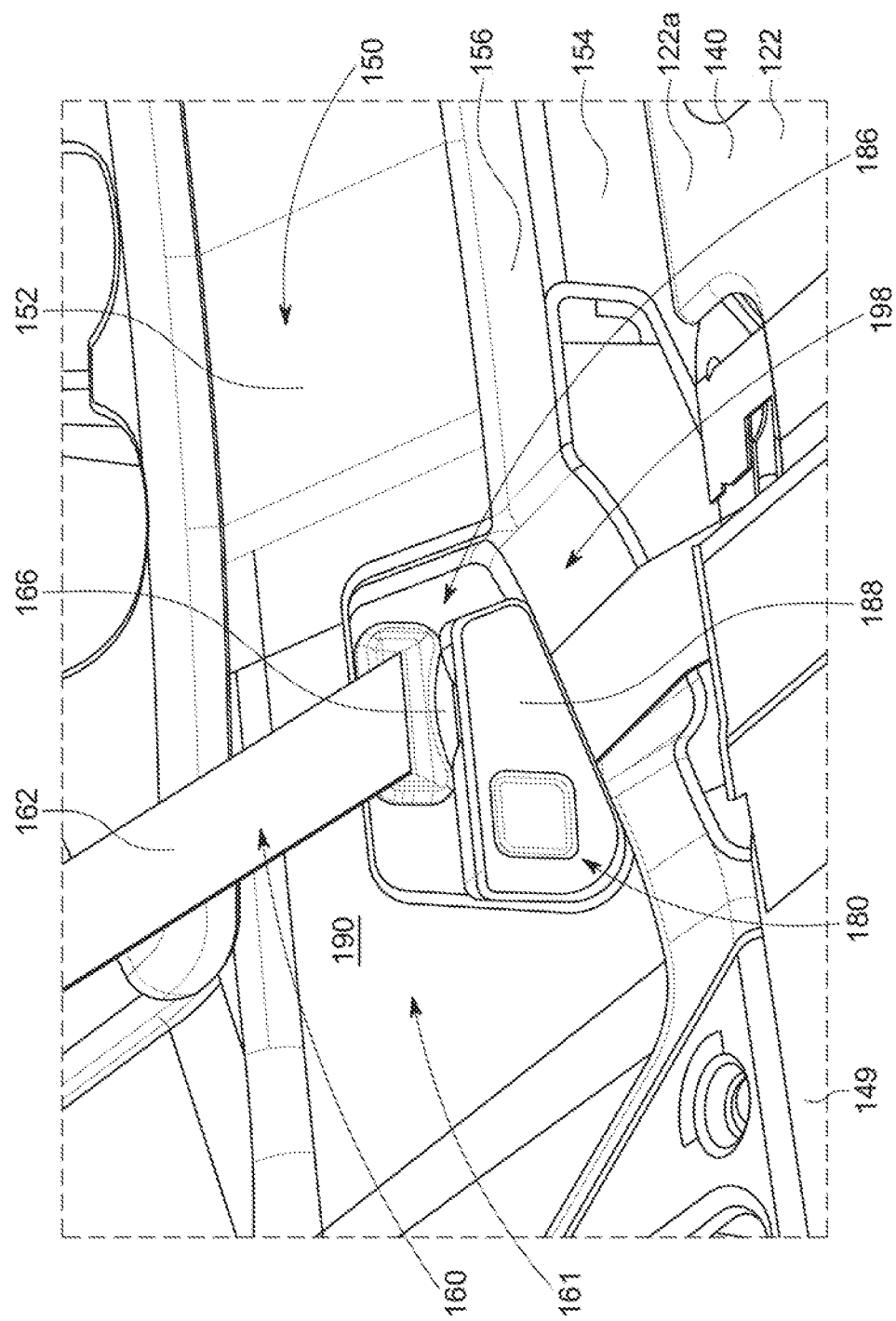
FIG. 6 is an enlarged perspective view of a portion of the side-lining structure depicting a belt holder coupled to a side lining and a tongue of a seat belt structure engaged with the belt holder, in accordance with one embodiment of the present disclosure.

Moreover, as shown in FIGS. 4, 5, and 6, the vehicle 100 includes a pair of side linings 150 arranged inside the vehicle 100 and connected to inner surface of the sidewalls 151 and the doors of the vehicle body 110. The side linings 150 extend in the longitudinal direction and are arranged on the opposite longitudinal sides 106, 108 of the vehicle 100. The side linings 150 are identical in structure, construction, and assembly, and therefore, for the sake of clarity and brevity, a structure, construction, and an assembly of only one side lining 150 that is arranged on the first longitudinal side 106 is explained. As shown, the side lining 150 extends from the rear end 104 of the vehicle body 110 towards a front end 102, and extends along a portion of the first longitudinal side 106 that is arranged proximate to the rear row 136 of seat 122a. In an embodiment, the side lining 150 includes a first portion 152 and a second portion 154 defining a step surface 156 therebetween. The step surface 156 is arranged proximate to the floor 149 of the vehicle 100 and is disposed horizontally and extends along the longitudinal direction of the vehicle 100.

Moreover, referring to FIGS. 5 and 6, the vehicle 100 includes one or more seat belt structures 160 for restraining one or more occupants of the one or more seats 122a of the rear row 136. The side lining 150 and the seat belt structure 160 together defines a side lining structure 161 of the vehicle 100. As shown, the seat belt structure 160 includes a safety belt webbing 162 having a first end (i.e., bottom end) fixedly connected to the floor 149 or a mount structure disposed proximate to the floor 149 of the vehicle 100. The seat belt webbing 162 may extend upwardly from the first end to a cavity or recess defined between a frame of the vehicle and the side lining 150. The cavity or recess may be arranged proximate to a roof 164 of the vehicle 100, and the seat belt webbing 162 extends inside the cavity to a winch around which a portion of the seat belt webbing 162 is coiled. It may be appreciated that the safety belt webbing 162 is extendable (reel out) from the winch and may reel back on the winch. A portion of the safety belt webbing 162 may reel out from the winch when a person, for example, the occupant of the rear seat 122a) pulls the safety belt webbing 162, while the portion of the safety belt webbing 162 may reel back automatically when the pull force is removed. In an embodiment, the safety belt webbing 162 may be made of polyester. Although the safety belt webbing 162 made of polyester is contemplated, it may be envisioned that the safety belt webbing 162 may be made of any other suitable materials known in the art.

Further, the seat belt structure 160 includes a tongue 166 adapted to slide along a length of the safety belt webbing 162, and includes a body portion 174 defining an elongated recess 176 through which the safety belt webbing 162 extends, and a tongue portion 178 for insertion/engagement with a buckle (not shown) to restrain an occupant of the seat 122a.

Additionally, the seat belt structure 160 includes a belt holder 180 coupled to the side lining 150 and arranged between the top end of the side lining 150 and the step surface 156 of the side lining 150. As shown, the belt holder 180 is arranged proximate to the step surface 156 and the seat belt webbing 162 extends between the side lining 150 and an inner side 182 of the belt holder 180. Accordingly, the belt holder 180 held a portion of the seat belt webbing 162 in abutment with an outer surface 190 of the side-lining 150 and restricts a sagging of the portion of the seat belt webbing 162 extending between the belt holder 180 and the floor 149 of the vehicle 100. As shown, in an embodiment, the side lining 150 defines a depression 186 and the belt holder 180 is arranged inside the depression 186. In some embodiments, the belt holder 180 is arranged inside the depression 186 such that an outer surface 188 of the belt holder 180 is arranged flush with the outer surface 190 of the side lining 150.

Figure 7:
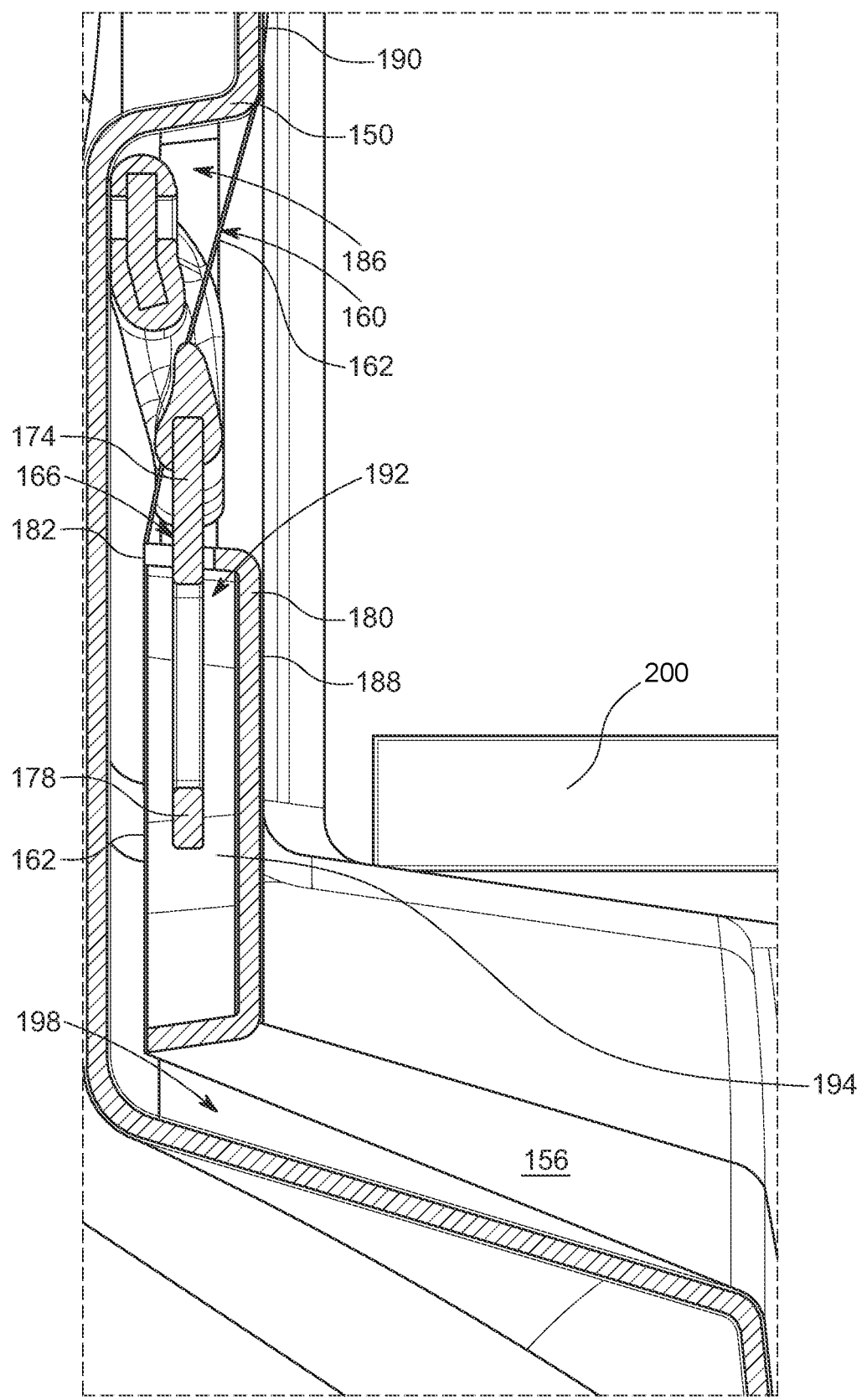
FIG. 7 is a sectional view of a portion of the side-lining structure depicting a portion of the safety belt webbing held between the side lining and the belt holder and the tongue extending inside a cavity, in accordance with one embodiment of the present disclosure.

Further, as shown in FIG. 7, the belt holder 180 defines a cavity 192, extending in a vertical direction, to receive the tongue structure 178 of the tongue 166 of the seat belt structure 160. Further, to hold the tongue structure 178 inside the cavity 192, the belt holder 180 includes an engagement structure 194 configured to engage with the tongue structure when inserted inside the cavity 192 and hold the tongue structure 178 inside the cavity 192. In an embodiment, the engagement structure 194 may be spring biased. Accordingly, to release the tongue structure 178 from the engagement structure 192, and hence to remove the tongue 166 from the cavity 192, the tongue 166 is to be pressed inwardly.

In this manner, the belt holder 180 facilitates in keeping the extension of the seat belt webbing 162 along the outer surface 190 of the side lining 150 and prevents any loose portion of the seat belt webbing 162 from making any contact with a cargo, such as, 4 feet wide standard sized sheet of plywood, being loaded in the cargo area 130 by arranging the rear seats 122a in the folded position. To position the seat belt webbing 162 across a torso of a person seating on the rear seat 122a, the tongue 166 is removed from the cavity 192 of the belt holder 180 and pulled to suitable length and the tongue 166 is again engaged with a suitable buckle.

Also, in some embodiments, as best shown in FIGS. 5 and 6, the step surface 156 of the side lining 150 defines a rut space 198 i.e., a vertical depression, arranged between the belt holder 180 and the floor 149 or lower end of the side lining 150. As shown, the rut space 198 is disposed below a lower edge of the belt holder 180. Accordingly, the seat belt webbing 162 extending below or downwardly of the belt holder 180 extends inside the rut space 198 abutting the side lining 150, as best shown in FIG. 6. In this manner, the rut space 198 facilitates in keeping the seat belt webbing 162 out of interference from the cargo while loading the cargo inside the vehicle 100. In this manner, the seat belt structure 160 (i.e., the belt holder 180), and hence the side-lining structure 162, helps to keep the safety belt webbing 162 safely stowed away when a standardized sheet of 4 feet wide plywood 200 is placed in the cargo area 130 as illustrated in FIG. 7.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle, comprising:
    a vehicle body defining a passenger compartment and a cargo area;
    a plurality of seats arranged inside the passenger compartment and disposed in a plurality of rows including a rear row, wherein one or more seats of the rear row is configured to move between an upright position and a folded position;
    a side lining mounted on a sidewall of the vehicle body and extending from a rear end of the vehicle towards a front end of the vehicle;
    a safety belt webbing configured to restrain an occupant of the one or more seats of the rear row and extending along a height of the side lining of the vehicle;
   a tongue movably connected to the safety belt webbing and adapted to move along the safety belt webbing; and
    a belt holder engaged to the side lining and defining a cavity therebetween, the belt holder is arranged proximate to a floor of the vehicle, wherein
    a portion of the seat belt webbing extends between the belt holder and the side lining, and the belt holder is configured to removably hold a portion of the tongue inside the cavity, and
    wherein the side lining defines a step surface arranged between the floor of the vehicle and the belt holder, and the step surface defines a rut space, the rut space being laterally outward of the step surface, and the seat belt webbing extends downwardly, inside the rut space, from the belt holder.

2. The vehicle of claim 1, wherein the plurality of rows includes three rows and the one or more seats of the rear row separates the passenger compartment from the cargo area when arranged in the upright position, and the one or more seats of the rear row is moved to the folded position to extend the cargo area of the vehicle.

3. The vehicle of claim 1, wherein the tongue defines an elongated recess, wherein the safety belt webbing extends through the elongated recess.

4. The vehicle of claim 1, wherein an outer surface of the side lining defines a depression and the belt holder is arranged within the depression.

5. The vehicle of claim 4, wherein the outer surface of the belt holder is flush with the outer surface of the side lining.

6. The vehicle of claim 1, wherein the belt holder includes an engagement structure configured to be removably engaged with the tongue to retain the portion of the tongue inside the cavity.

7. A side-lining structure for a vehicle having a vehicle body including a sidewall, the side lining structure comprising:
    a side lining adapted to be mounted to the sidewall and configured to extend from a rear end of the vehicle towards a front end of the vehicle;
    a belt holder engaged to the side lining and adapted to be disposed proximate to a floor of the vehicle;
    a seat belt webbing configured to restrain an occupant of a seat of the vehicle, wherein a portion of the seat belt webbing extends and is held between the belt holder and the side lining; and
    wherein the side lining defines a step surface arranged between the floor of the vehicle and the belt holder, and the step surface defines a rut space, the rut space being laterally outward of the step surface, and the seat belt webbing extends downwardly, inside the rut space, from the belt holder.

8. The side-lining structure of claim 7, wherein a cavity is defined between the belt holder and the side lining, and the belt holder is configured to removably hold a tongue coupled to the seat belt webbing inside the cavity.

9. The side-lining structure of claim 8, wherein belt holder includes an engagement structure configured to be removably engaged with the tongue to retain the tongue inside the cavity.

10. The side-lining structure of claim 8, wherein the tongue defines an elongated recess, and the safety belt webbing extends through the elongated recess.

11. The side-lining structure of claim 7, wherein an outer surface of the side lining defines a depression and the belt holder is arranged within the depression.

12. The side-lining structure of claim 11, wherein an outer surface of the belt holder is flush with the outer surface of the side lining.

* * * * *